Sept. 4, 1923. 1,467,266
J. H. L. DE BATS
BIT AND METHOD OF MAKING THE SAME
Filed May 17, 1921 2 Sheets-Sheet 1
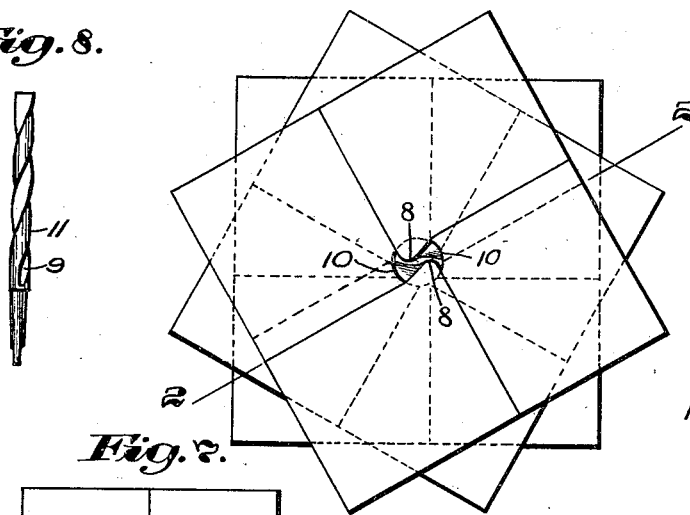
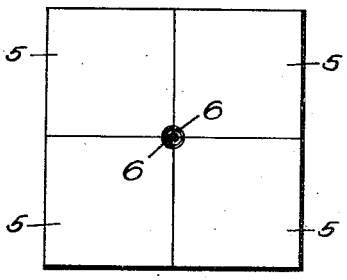
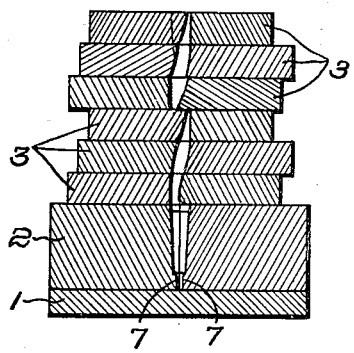
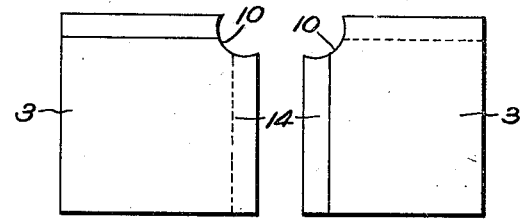
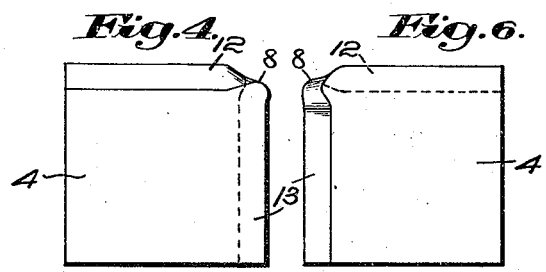
Inventor:
Jean H. L. DeBats
by Emery Booth Janney Varney
Attys Sept. 4, 1923.

J. H. L. DE BATS 1,467,266

BIT AND METHOD OF MAKING THE SAME

Filed May 17, 1921          2 Sheets-Sheet 2

Inventor:
Jean H. L. DeBats
by Emery Booth Janney Varney
Attys.

Patented Sept. 4, 1923.

1,467,266

UNITED STATES PATENT OFFICE.

JEAN H. L. DE BATS, OF WHITMAN, MASSACHUSETTS.

BIT AND METHOD OF MAKING THE SAME.

Application filed May 17, 1921. Serial No. 470,412.

*To all whom it may concern:*

Be it known that I, JEAN H. L. DE BATS, a subject of the Queen of Holland, and resident of Whitman, county of Plymouth and Commonwealth of Massachusetts, have invented an Improvement in Bits and Methods of Making the Same, of which the following description, in connection with the accompanying drawings, is a specification, like characters on the drawings representing like parts.

This invention relates to the casting of metals, and particularly to the mold therefor, and its object is to provide a novel chill mold and also a drill or other tool cast therein, both having among others, the following novel characteristics.

Figure 13:
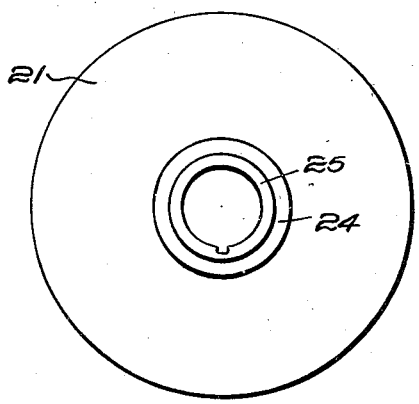
Figure 10:
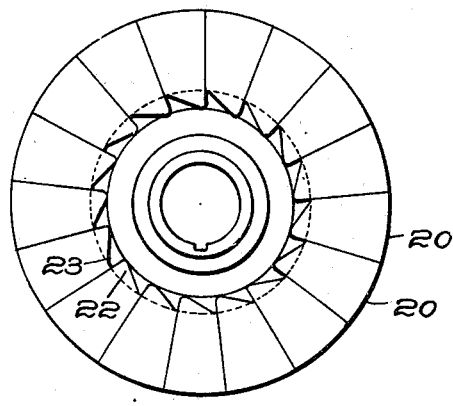
Figure 11:
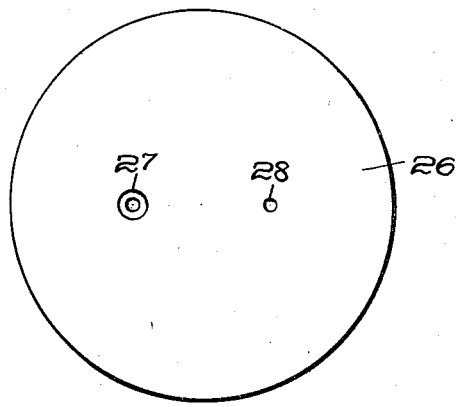
Figure 14:
Figure 12:
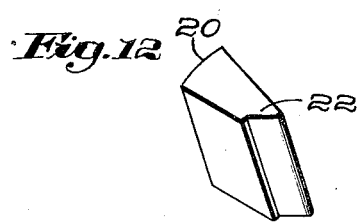

In the present embodiment of my invention, Fig. 1 is a plan of the mold;
Fig. 2, a vertical section on the line 2—2, Fig. 1;
Figs. 3 and 4, plans respectively of the groove mold plate sections;
Figs. 5 and 6, opposite or lower face views of the same;
Fig. 7, a plan of the shank mold plate;
Fig. 8, a longitudinal elevation of a tool cast in the mold illustrated;
Fig. 9, an end view of the tool;
Fig. 10, a plan of a modified form of mold for casting a tool of different form;
Fig. 11, a similar view of the same mold with gate therein;
Fig. 12, a perspective of one of the mold parts;
Fig. 13, a plan of the mold base; and
Fig. 14, a side view of the tool.

My novel mold is particularly adapted for the casting of tools and other articles of irregular shape or outline, such as a drill, and in Fig. 8, such a tool is illustrated.

Heretofore tools of this nature have been fashioned from solid rods of the particular metal desired, owing to the difficulty of making the pattern, and also owing to the difficulty of making castings of this general nature free from cracks and other imperfections so well known to those familiar with the art.

In the present embodiment of the invention, the mold, Figs. 1 to 6, comprises a base 1, a shank plate or part 2, and a plurality of groove plates or parts 3, 4, in this case superimposed one upon the other, Fig. 2, in the order named.

These plates or parts may be of any desired and suitable material, as metal, and of any convenient thickness. One object of my invention is to provide a preferably unlocked, and therefore yielding or elastic mold; for instance one, the parts of which will, during the pouring of the metal, hold their positions without locking or sustaining means and, as the metal cools, thereafter yield as may be necessary, to prevent cracks, strains or other imperfections in the casting. Of course if desired the parts may be locked for any purpose temporarily as if to assist in assembling the mold.

To the above end, Fig. 1, I prefer to make each plate of a plurality of sections. In the case of the shank plate 2, Fig. 7, as the shank is round and gradually tapering, the plate may be divided into four sections 5, the inner adjoining corners 6 of which are rounded so that, when assembled, the plates form a mold for the round shank. The bottom edges of these adjacent corners may be fashioned, Fig. 2, to provide the casting with the usual opposed flat faces 7 to engage the chuck of the stock, not shown, but of the usual conventional form.

The groove or spiral plate sections 4, Figs. 1, 4, 6, are rounded at their inner adjacent corners 8, which corners, in the assembled plate, Fig. 1, act to form in the casting, Fig. 8, the bed or bottom of the spiral groove 9 of the drill.

The groove or spiral plate sections 3, Figs. 1, 3, 5, have their inner adjacent corners rounded or cut out at 10 to form in the mold, Fig. 1, the body 11 of the drill.

As the groove and body are both spiral in longitudinal form, obviously each assembled plate of a plurality of sections must, when superimposed upon its predecessor, be axially turned relatively to it a certain distance, to produce in the casting the complete spiral groove and body.

Of course the degree of axial turning of the plate depends upon the sharpness of the spiral of the completed drill which, in turn, is determined somewhat by the length of the drill. Assuming that the several mold sections are substantially square in outline, which, however, is not necessary, the several plates when turned axially as described, would, in vertical section, Fig. 2, present a staggered or stepped appearance.

Furthermore, as the bottom or bed of the groove 9 is spiral, the edge 12 of these rounded corners, and of the section 4, Fig. 4, is bevelled outwardly looking down, and the adjacent edge 13 is on the other hand, bevelled inwardly as you look down upon it. The assembled mold would therefore present progressively bevelled edges 12, 13, from the bottom toward the top of the mold, the complete stack or series of bevelled plate edges corresponding to the length and pitch of the spiral of the completed drill casting. As the outer surface or wall of the drill is perpendicular axially of the drill, of course the rounded cut away edge 10 of the section 3 is not bevelled, although the adjacent section edge 14 is bevelled to correspond to and cooperate with the adjacent edge 13 of section 4 of the plate. On top of the uppermost plates 3, 4, may be placed a usual gate member, not shown, if desired.

On account of the well known tendency of foreign material or impurities in the molten metal to sink to the bottom, I prefer to cast my tool or article bottom end up so that the upper or cutting end, on which is imposed the greatest strain in proportion to its cross-area, may be as free as possible from such impurities which act to weaken the body structure.

The mold having been assembled as described and illustrated, the metal is poured in the usual manner.

Inasmuch as the plate sections are not locked, it will be obvious that as the metal is chilled and shrinks, the mold sections will be free to move to the extent necessary to conform to the cooling casting so that it will be free from strains, cracks and imperfections commonly found in castings made in solid or locked chill molds.

Furthermore, it is common knowledge to those familiar with the art that, in casting metal, the segregation or separation of the molecules of the metal which is caused partly by the chilling of the casting from the outside, takes place near the center of the mass, or if there are two or more relatively large masses connected by a smaller section, then near the center of each of the masses.

Hence, in the present case, Fig. 9, the body 11 of the drill consisting of two spiral ribs 16, connected by a thin web 17 between the bottoms or beds of the two grooves 9, the points of segregation would be at 18, 19, or near the centers of the ribs 16, and not in the longitudinal central axis of the drill where the greatest strain naturally comes. Thus a drill cast in my novel mold is of superior strength from this cause.

In Fig. 10 to 13 I have illustrated a modified form of mold adapted for casting milling cutters.

This form of mold, Fig. 10, comprises a plurality of properly fashioned mold parts 20 adapted to be positioned upon a base 21. Each mold part is fashioned on its inner end 22 to form, in connection with an adjacent mold part, one tooth 23 of the cutter. The parts are, in general, the outline of a keystone so that they support each other when assembled and require no other locking means.

As these cutters are usually made of very hard, high speed tool steel or alloy it is difficult to machine the same to fit the shaft. To obviate this difficulty I have found it convenient to cast the cutter of the desired metal about a softer collar or hub which may more readily be machined.

For that purpose I provide, Fig. 13, the base 21 with a low circular rib 24 to act as a guide for and within which is positioned the soft metal collar 25 about which the casting is to be made.

The mold parts having been assembled on the base 21 as described and shown in Fig. 10, I preferably place over the same any suitable gate member 26, Fig. 11, containing a gate opening 27 and air vent 28 and pour the metal.

Obviously as the metal cools and shrinks the several mold parts 20 will yield a little under the pressure within to accomodate themselves to the action of the casting, thus preventing the formation of any crack, strain or other imperfection from the non-yielding of the mold.

My invention is not limited to the illustrative embodiment shown, and I claim:

1. A chill mold comprising a plurality of superimposed pressure responsive mold parts each comprising a plurality of sections, adapted to be positioned in substantially the same horizontal plane, edges of one or more of the sections being cut away, and edges of one or more of the sections being fashioned near the vertical axis of the mold.

2. A chill mold comprising a plurality of superimposed pressure responsive mold parts each comprising a plurality of sections, adapted to be positioned in substantially the same horizontal plane, edges of one of more of the sections being cut away, and edges of one or more of the sections being fashioned near the vertical axis of the mold, and adapted to provide a spiral path from the top to the bottom of the assembled parts.

In testimony whereof, I have signed my name to this specification.

JEAN H. L. DE BATS.